INVENTOR
D. W. BERREMAN
BY H. O. Wright
ATTORNEY

Nov. 26, 1968    D. W. BERREMAN    3,413,059
GAS LENSES FOR ULTRAHIGH FREQUENCY WAVE ENERGY PROVIDED BY
OPPOSING FLOWS OF GASES
Filed March 23, 1964    2 Sheets-Sheet 2

United States Patent Office 3,413,059
Patented Nov. 26, 1968

3,413,059
GAS LENSES FOR ULTRAHIGH FREQUENCY WAVE ENERGY PROVIDED BY OPPOSING FLOWS OF GASES
Dwight W. Berreman, Westfield, N.J., assignor to Bell Telephone Laboratories, Incorporated, New York, N.Y., a corporation of New York
Filed Mar. 23, 1964, Ser. No. 353,689
6 Claims. (Cl. 350—179)

ABSTRACT OF THE DISCLOSURE

This application describes apparatus and methods for focusing an optical beam by means of flowing gases. In the embodiments described, two transparent gases, having different refractive indices, are caused to flow into an enclosure in opposite directions, thereby establishing a curved front between them extending along a direction transverse to the direction of beam propagation. The effect of such a curved front between two dissimilar gases is to create a transparent gas lens along the beam path. The accumulated gas is permitted to escape through suitably located exhaust vents.

---

Figure 1:
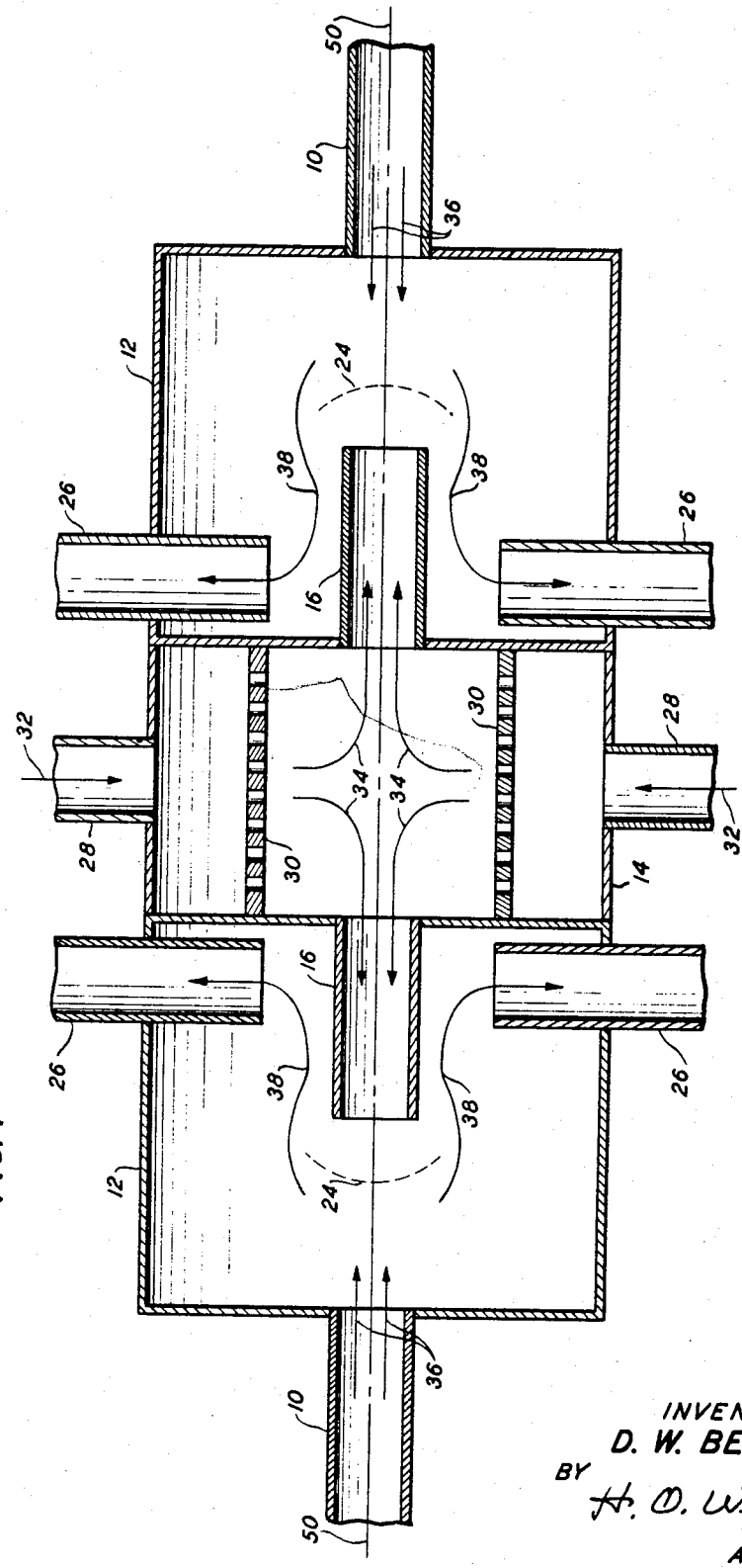

This invention relates to the long distance transmission of electromagnetic waves. More particularly, it relates to the long distance transmission of beams of ultrahigh frequency wave energy, including visible light and adjacent energy bands, and to the prevention of scattering of the rays of such beams during transmission.

Many arrangements for generating and utilizing extremely narrow, intense and highly directive beams of substantially coherent, very high frequency, electromagnetic wave energy, principally in the visible light and adjacent energy bands, embracing wavelengths between the approximate limits of 1000 Angstroms and two million Angstroms, inclusive, have been devised during the last several years. Numerous and varied devices for generating such wave energy beams, usually designated "lasers," have been and are being invented and developed with astonishing proliferation.

In view of the extremely high frequencies of such waves and the wide frequency range over which they are operative, the above developments give promise of the practicability of utilizing vastly extended ranges of frequency for systems of extremely large capabilities for the transmission of intelligence such as speech, video, and data transmission signals and the like.

Notwithstanding the fact that lasers devised during the last few years are capable of producing extremely narrow, highly directive, substantially coherent energy beams, transmission of even these beams over substantial distances is accompanied by a very appreciable spreading of the beam, resulting in a large diminution of the energy usually referred to as attenuation, received at a distant point on the axis of the beam. Beam spreading also involves the possibility that a significant portion of the energy beam may be intercepted by other stations as well as by the intended receiving station.

Furthermore, in many instances it is desired that the laser beam be transmitted through an enclosing pipe or conduit, of a material impervious to gas. A specifically controlled gas or mixture of gases can then be employed to fill the conduit thus providing a medium of controllable uniform and stable characteristics, so that the transmission can, for example, be rendered free from unfavorable effects such as those resulting from changing atmospheric conditions such as rain, snow, sleet, fog, temperature effects and the like. Such a system, obviously, would, if the pipe or conduit is also opaque to light, eliminate all possibility of interception of portions of the beam by unauthorized receiving stations, thus assuring the preservation of complete privacy of communication.

The above-mentioned spreading of the beam when an enclosing conduit (which must necessarily have transverse cross-sectional dimensions much larger than the wavelength of the light or similar energy to be transmitted) is employed obviously may result, for a long distance system (several hundred miles long, for example) in the multiple reflection of the spreading rays by the conduit walls, destroying the coherency of the beam and producing serious attenuation and distortion of the transmitted signals. Thus it is apparent that the use of means for substantially eliminating beam spreading is important even when an enclosing conduit is employed.

In applicant's copending application Ser. No. 347,166, filed Feb. 25, 1964, it is proposed to eliminate beam spreading by establishing transverse temperature gradients of diverse directivities distributed along the beam path.

The present invention proposes alternative arrangements to reduce to substantial elimination the above described deleterious effects of beam spreading.

The use of thin solid lenses of glass or the like distributed along the path for such a puropse has not proven very satisfactory both because of the substantial attenuation introduced by even the best of such lenses, in view of the large number of lenses required, and especially because of reflection effects at the surfaces of the lenses.

Accordingly, it is proposed in accordance with the present invention to establish at intervals along the enclosing conduit of a beam transmission system focusing arrangements in which opposing flows of transparent gases of substantially differing refractive indices establish curved fronts between them of approximately spherical shape and thus effectively create a transparent gas lens in the path of the beam and transversely thereto.

A principal object of the invention is therefore to eliminate the difficulties resulting from beam spreading in ultrahigh frequency energy beam transmission systems.

Figure 2:
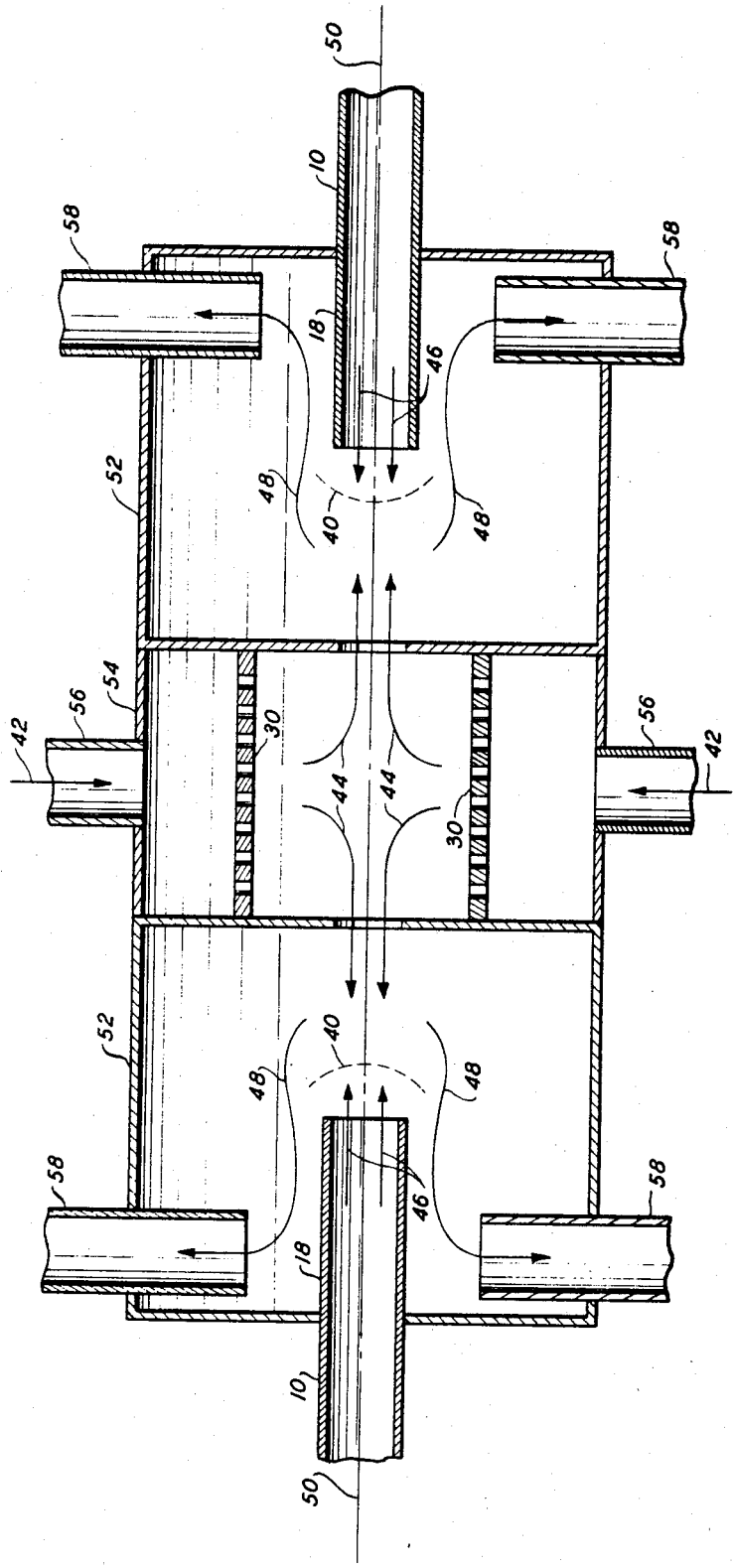

Other and further objects, features and advantages of the application of the principles of the present invention will become apparent from a perusal of the following detailed description of illustrative embodiments of said principles and from the appended claims taken in conjunction with the accompanying drawing, in which:

FIG. 1 illustrates in longitudinal cross section a diagrammatic representation of a first arrangement for practicing the invention; and FIG. 2 illustrates in like manner a second arrangement for practicing the invention.

In more detail, in FIG. 1 the end portions 10 represent portions of a long conduit having a longitudinal axis 50. It is contemplated that a laser beam or the like is to be transmitted through the conduit in a long distance ultrahigh frequency beam transmission system which may interconnect widely spaced terminal points as, for example, New York and Chicago.

Periodically, in accordance with the present invention, a group of (preferably) three cylindrical cavities or chambers 12, 14 and 12, each of a transverse diameter substantially greater than the diameter of conduit 10 and a length approximately equal to one-half its own diameter, are, in effect, inserted in tandem relation with conduit 10, the central chamber 14 being interconnected with the adjacent chambers 12 by short cylindrical members 16 of a diameter substantially the same as that of conduit 10. Members 16 protrude well into their associated chambers 12, as shown.

The chambers 12 and 14 have two or more ports or openings 26 and 28 each, respectively, in their outermost peripheral surfaces, as shown, symmetrically positioned around axis 50 of the conduit.

In the arrangement of FIG. 1, it is contemplated that a transparent gas of a relatively lower refractive index such as helium or clean air or the like is to be injected into conduit 10 on both sides of the group of three chambers by any of numerous convenient means well known to those skilled in the art in such a manner or at such a distance from the chambers 12 that a smooth unidirectional flow free from any substantial turbulence enters the chambers 12 on the left and right as indicated by the arrows 36. Similarly, a flow of a transparent gas indicated by arrows 32 of appreciably greater index of refraction such as $CO_2$, or the like, is injected into chamber 14 through peripheral ports 28 by any of numerous conventional means. Gas 32 flows through perforated baffle members 30 to inhibit turbulence and then from chamber 14 to the left and right chambers 12 through tubular members 16 as indicated by arrows 34 at the left and right respectively of chamber 14.

The flows of the gases indicated by arrows 34 and 36 are respectively adjusted so that the chambers 12 are in large part filled with gas of the lower refractive index except for the regions at the ends of members 16 bounded by the dotted lines 24, respectively, in which regions the higher refractive index gas predominates. Thus fronts of substantially spherical contour between the gases of lower and higher indices are established at lines 24 within the chambers 12 to the left and right of chamber 14 as shown. Of course, there will be some diffusion of the lighter gas into the heavier gas in the just mentioned regions but the net refractive index in these regions will be higher than that of the gas largely of the lower refractive index in the remainders of chambers 12.

A sufficient volume of the combined gases predominately of the lower index gas is removed or allowed to escape as indicated by the arrows 38 through peripheral vents 26 from the chambers 12 that in view of the flushing action thus effected no appreciable further diffusion of the respective gases into each other near the respective centers of chambers 12 than indicated by the broken lines, that is, the fronts 24, will take place. Members 26 extend into their respective associated chambers 12 sufficiently to cause the gases being exhausted to travel in approximately horizontal paths from the centers of chambers 12 to the members 26.

Since the gas between the fronts 24 is of higher refractive index than that in the conduit 10 and the remainders of the chambers 12, and the fronts 24 are convex, the arrangement of FIG. 1 establishes a positive or converging "gas lens" adjacent each front 24, the two "lenses" so formed having together a relatively very long focal length. Since the fronts are substantially concentric with axis 50 and transverse to axis 50, they will act to correct the tendency of the rays of the beam to spread or to diverge from axis 50.

Obviously, a single lens can be realized by omitting one of the chambers 12 and its associated coupling member 16 and connecting the conduit 10 on the side of the omitted chamber directly through a transversely positioned partition of plane optical glass, or the like, to chamber 14.

As a typical design of an arrangement as illustrated in FIG. 1, the diameter of conduit 10 may be one-half inch, the diameters of the chambers 12 and 14 may be four inches, the axial dimensions of chambers 12 and 14 may each be two inches, the diameters of coupling members 16 may be one-half inch, and the diameters of ports 26 and 28 assuming four ports per chamber may each be one-quarter inch. The gas of lower refractive index may be helium or air where the gas of higher refractive index is air or carbon dioxide, respectively. Also, the combination of helium for the lower index gas and carbon dioxide for the higher index gas may be employed. The volume of gas injected from conduit 10 into each chamber 12 may be approximately 0.8 cubic foot per minute. The volume of gas injected from chamber 14 into each chamber 12 may be approximately 0.2 cubic foot per minute. The volume of the combined gases exhausted from each chamber 12 may then be approximately one cubic foot per minute. The combined focal length of the two lenses at fronts 24 will then be substantially 200 feet, for the combinations of helium and air, and air and carbon dioxide, or 100 feet for the combination of helium and carbon dioxide as the gases of lower and higher refractive indices, respectively.

Somewhat smoother action, involving an appreciable reduction of distortion from such disturbing factors as convection effects and the like, may be obtained by employing two supplies of gas which have appreciably different indices of refraction but substantially the same densities. A combination of this type, by way of example, is argon as the low index of refraction gas and a well integrated mixture of six parts of carbon dioxide with one part of methane as the high index of refraction gas. Many other such combinations can be readily selected by those skilled in the art. The specific additional combination last mentioned above will result in a combined focal length of substantially 200 feet for the two lenses at fronts 24 in the above described illustrative arrangement.

Reducing the dimensions of the above described specific illustrative arrangement by one half or doubling the effective pressures within the chambers 12 will reduce the effective focal length by substantially one half.

In FIG. 2 an arrangement similar to that of FIG. 1 is shown. It differs from that of FIG. 1 in that gas of a higher refractive index indicated by arrows 46 is injected from conduit 10 through a coupling member or extension 18 into each of the chambers 52 and gas of a lower refractive index indicated by arrows 44 is injected from chamber 54 to each of the chambers 52. This lower index gas enters chamber 54 through ports 56 as indicated by arrows 42 and passes through perforated baffles 30 to inhibit turbulence.

In the arrangement of FIG. 2, therefore, "fronts" are established as indicated by the dotted or broken lines 40 at the inner ends of members 18 respectively as shown. Obviously, the arrangement of FIG. 2 is substantially equivalent from an operational standpoint with that of FIG. 1.

Many variants of the above described illustrative embodiments will readily occur to those skilled in the art. For example, by simply interchanging the gases of differing refractive indices and their respective flows, effectively "negative" or diverging gas lenses may obviously be realized. Accordingly, the arrangements shown above are to be understood to be illustrative of the application of the principles of the invention but are not to be taken as limiting the same.

What is claimed is:

1. A gas lens for the light wave frequency region comprising a mixing chamber, a path through said chamber adapted to accommodate the passage of an energy beam of light wave frequency, means for introducing a first flow of a substantially transparent gas of a first specific refractive index into said chamber along said path in one direction, means for introducing a second flow of a substantially transparent gas of a second specific refractive index, differing substantially from said first refractive index, into said chamber along said path in the opposite direction, and exhaust means provided in said chamber to permit the escape of said gases, the respective rates of flow of said gases being proportioned to form a substantially spherical front between them concentric with and transversely to said path whereby an energy beam projected along said path will be subjected to a focusing effect.

2. The lens of claim 1 in which the gases employed are helium and carbon dioxide respectively.

3. The lens of claim 1 in which the gases are of equal density.

4. The method of focusing an optical frequency beam propagating through a pair of ports located on opposite sides of an enclosure comprising the steps of; directing continuous flows of two gases having substantially different refractive indices through said ports in opposite directions so as to impinge upon each other within said enclosure; and removing from said enclosure accumulated gas; said gases being asymmetrically introduced into and exhausted from said enclosure so as to establish a substantially curved front between the two gases transverse to the direction of propagation of said beam.

5. A gas lens for ultrahigh frequency electromagnetic wave energy comprising a chamber; a first gas input port through which a flow of a first gas is introduced into said chamber; a second gas input port, aligned along a common axis with said first input port, through which a flow of a second gas having a different refractive index than said first gas is introduced into said chamber; said gas flows being in opposite directions to form an interface therebetween; and means for exhausting said gases from said chamber symmetrically disposed about said axis and asymmetrically disposed with respect to said input ports whereby the interface encountered by a beam of ultrahigh frequency wave energy projected along said axis is curved.

6. The lens according to claim 5 wherein said first port is located in a wall of said chamber; and said second port extends into and is located at about the center of said chamber.

References Cited

UNITED STATES PATENTS 2,980,802  4/1961  Bracey et al.

JOHN K. CORBIN, *Primary Examiner.*